United States Patent [19]
Koai

[11] Patent Number: 5,214,729
[45] Date of Patent: May 25, 1993

[54] DYNAMIC OPTICAL DATA BUFFER

[75] Inventor: Kwang-Tsai Koai, Concord, Mass.

[73] Assignee: GTE Laboratories Incorporated, Waltham, Mass.

[21] Appl. No.: 816,436

[22] Filed: Dec. 31, 1991

[51] Int. Cl.⁵ .............................................. G02B 6/28
[52] U.S. Cl. ........................................ 385/27; 385/24
[58] Field of Search .................... 369/124; 385/12, 24, 385/27

[56] References Cited

U.S. PATENT DOCUMENTS

| | | | |
|---|---|---|---|
| 4,495,656 | 1/1985 | Shaw et al. | 359/140 |
| 4,681,395 | 7/1987 | Lindsay et al. | 385/12 |
| 4,856,862 | 8/1989 | Passmore et al. | 385/24 |
| 4,997,249 | 3/1991 | Berry et al. | 385/27 |

Primary Examiner—John D. Lee
Assistant Examiner—John Ngo
Attorney, Agent, or Firm—Lawrence E. Monks

[57] ABSTRACT

Apparatus for an an optical data buffer is disclosed which includes an optical splitter for splitting an incoming signal, and multiple fiber optic delay lines of varying length to delay the split signals. The delayed signals are combined and presented to an amplifier, which selectively amplifies or blocks further propogation of the individual signals. In another embodiment of the invention, the input signal is split and each signal is passed through a separate fiber delay line of differing length before being presented to an amplifier which selectively amplifies or blocks the individual signals. The output of the amplifier is combined into a single fiber optic cable.

8 Claims, 3 Drawing Sheets

DYNAMIC OPTICAL DATA BUFFER

FIELD OF THE INVENTION

This present invention relates generally to apparatus for optical buffering and more particularly to apparatus for optical buffering with a variable time duration.

BACKGROUND OF THE INVENTION

Electronic data buffers are extensively used in today's computers, electronic instruments, and communication systems. As optical signals become more and more widely used in the transmission and processing of information, it is clear that converting optical signals to electrical signals for buffering is quite inefficient. Conventional data buffering utilizes electronic random access memory (RAM), which temporarily stores data for future use. In the optical domain, optical bistable devices such as bistable lasers, amplifiers, and self electrooptic devices (SEED's) have been proposed as optical stores. These optical bistable devices operate in a bit by bit fashion. However, the bit rate of these devices is limited to approximately a gigibit per second as described by H. F. Liu et al. in "Switching Characteristics and Maximum Repetitive Frequency of INGAASP-/INP Bistable Injection Lasers", IEEE Journal of Quantum Electronics, Vol. 2E-24 January 1988, pages 43-51.

As an alternative, single mode optical fiber delay lines having a very low loss characteristic have been used as a temporary storage for optical data of a short fixed duration. These optical fiber delay lines operate in a fixed time duration with unlimited bit rates but have the restriction that the signal is attenuated due to the losses associated with the splitting, combining, and fiber loss.

OBJECTS OF THE INVENTION

It is a principal object of the present invention to obviate the above-noted and other disadvantages of the prior art.

It is a further object of the invention to provide an optical buffer apparatus with a selective delay time.

It is a still further object of the invention to provide an N-slot optical buffer apparatus that compensates for signal attenuation in the buffer.

SUMMARY OF THE INVENTION

The above and other objects and advantages are achieved in one aspect of this invention by splitting an incoming optical signal into multiple banches by an optical splitter. The branch outputs of the optical splitter are coupled to fiber optic cables of varying lengths. These branches are then combined at an optical combiner which is placed in series with an optical amplifier to compensate for the losses associated with the splitter and the combiner. With the amplifier "on" the optical signal is amplified, but with the amplifier "off", the signal is absorbed and does not propagate further. The branches have differing time delays due to varying cable lengths, and thus the amplifier can be used to selectively block or amplify signals In another aspect of the invention, each of the output branches from a fiber optical splitter are coupled via fiber optic cable to an amplifier prior to being combined at an optical combiner. The amplifier, positioned in each output branch of the splitter, is a semiconductor laser amplifier having the ability to selectively amplify, detect, and block a signal. Each output branch of the splitter is a separate length of fiber optic cable, and accordingly the time delay through the branches differs according to the varying cable lengths. By selectively blocking or amplifying an individual signal in a branch, a variable optical delay is created.

DESCRIPTION OF THE INVENTION

Figure 1:
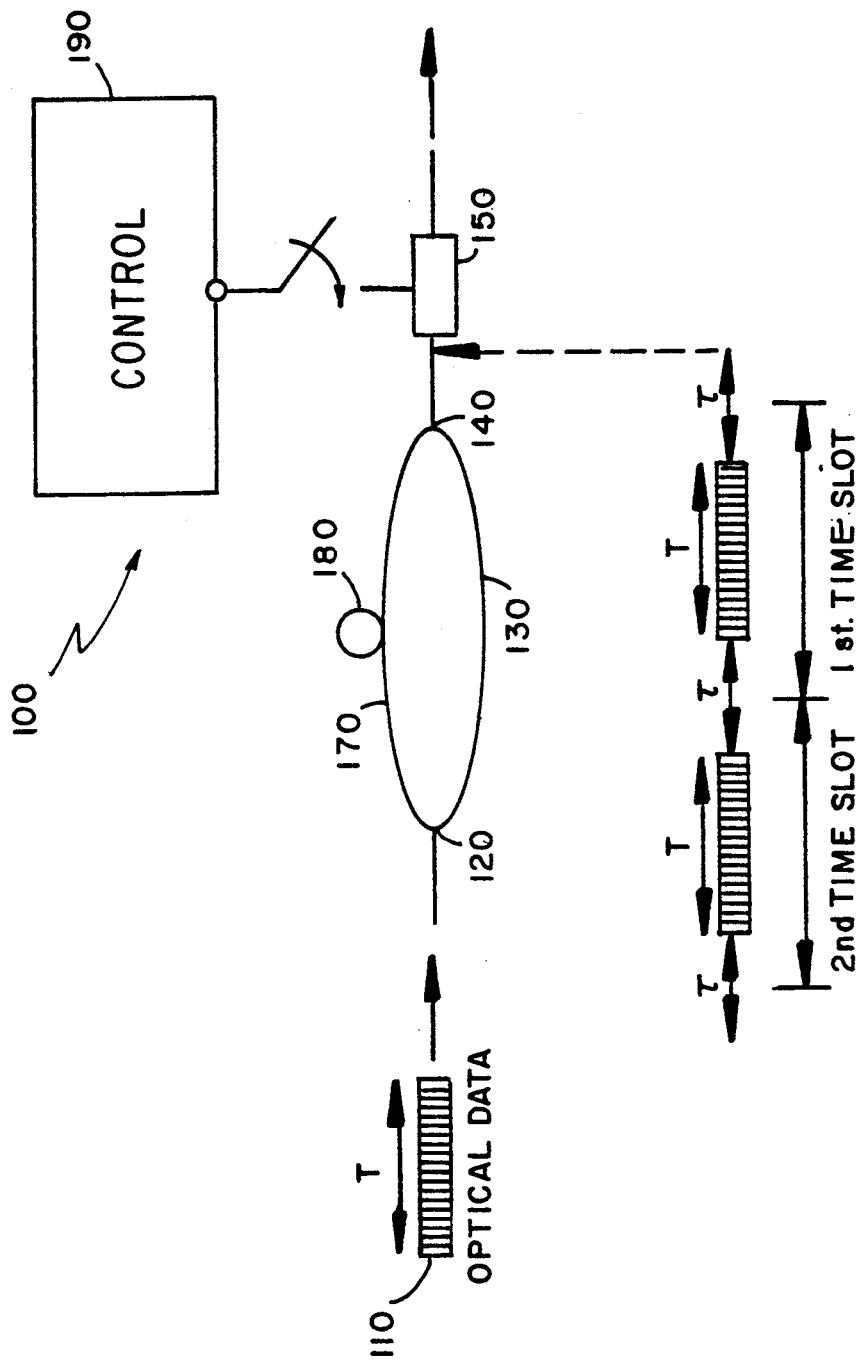
FIG. 1 is an illustration of a two-slot optical buffer in accordance with the present invention.

FIG. 1 depicts a two slot optical data buffer 100 in accordance with the instant invention. An optical data signal 110, having a duration of time T, is presented at the input port of the optical data buffer. The optical data signal 110 can be designed to represent only one bit, multiple bits, or a whole data frame. The optical data signal is split with a 1×2 passive splitter 120, suffering an insertion loss of approximately 3.2 db. Once the optical data signal is split, the optical data signal in the first branch 130 of the buffer 100 travels directly to a passive combiner 140 which is positioned in series with an optical amplifier 150, and incurrs a delay of $\tau$, where $\tau$ is defined as the travel time for the optical data signal to reach the input port of the optical amplifier switch. The optical amplifier switch is a polarization-independent optical amplifier switch with a fiber-to-fiber gain which increases the signal strength. The optical amplifier switch has excellent isolation in its "off" state (zero bias) and a very fast transition between "on" and "off" states. The duration $\tau$ is designed to be longer than the switch state transition time of the optical amplifier.

The signal in the second branch 170 of the buffer 100 propagates along a fiber delay line 180, having a delay of $T+\tau$. The signals from the two branches are combined at a 2×1 combiner 140 into a single fiber cable, and delivered to an optical amplifier 150. Consequently, one optical data signal lags the other, arrives at the optical amplifier delayed by time $T+\tau$. The optical amplifier switch may either selectively amplify or block the respective data signals. A control circuit 190 controls the operation of optical amplifier switch 150. By amplifying one signal and blocking the other, a two-slot fixed time dynamic optical buffer is created.

The optical data signal travelling in the undelayed output branch of the splitter suffers a power loss of approximately 6.4 db. The other data signal suffers a higher loss due to the extra length of the fiber delay line. A one kilometer fiber delay line has a time delay of approximately five microseconds and a loss of about 0.2 db, assuming fiber loss is 0.2 db per km. Small deviations in optical power of approximately less than two db can be tolerated in most system applications, however, one also has the option to use passive splitters or combiners at a splitting ratio that would equalize the optical power of the two data cells.

Figure 2:
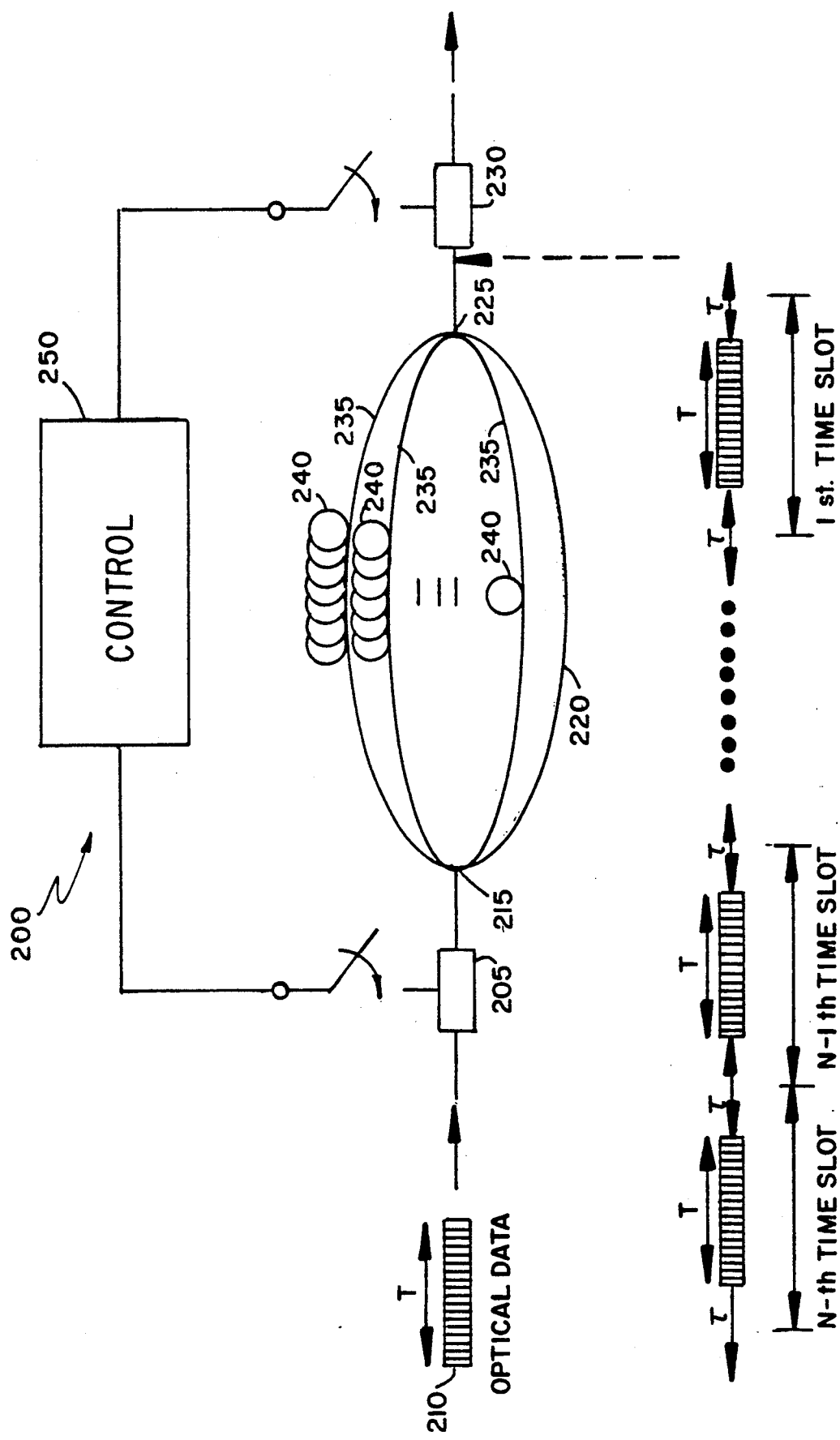
FIG. 2 is an illustration of a N-slot optical buffer, utilizing an input optical amplifier switch.

A general N-slot optical data buffer 200 is shown in FIG. 2, in which an input optical amplifier switch 205 is utilized to block the input signal 210 until previous signals have exited the buffer 200. The input optical amplifier 205 may be also utilized to increase the input signal power, allowing for a greater number of delay branches as described later.

An optical data signal 210, having a duration of time T, is presented at the input port of the optical data buffer 200. Again, the optical data signal 210 can be designed to represent only one bit, multiple bits, or a whole data frame. The optical data signal 210 is split with a 1×N passive splitter 215, suffering an insertion loss of approximately 3.2 db. Once the optical data signal is split, the optical data signal in the first branch 220 of the buffer 200 travels directly to a passive combiner 225 which is positioned in series with an optical amplifier 230, and incurrs a delay of $\tau$, where $\tau$ is defined as the travel time for the optical data signal in the first branch 220 to reach the input port of the optical amplifier switch 230. The optical amplifier switch is a polarization-independent optical amplifier switch with a fiber-to-fiber gain which increases the signal strength. The optical amplifier switch has an excellent isolation in its "off" state (zero bias) and a very fast transition between "on" and "off" states. The duration $\tau$ is designed to be longer than the switch state transition time of the optical amplifier. Each of the other N−1 split signals propagates into one of the N−1 fiber delay lines 235, and is delayed by an optical delay 240. The delay may be an extended length of fiber cable. The delay associated with the $k^{th}$ branch is $(k-1) \times T + k \times \tau$. The signals from the N branches are combined at a N×1 combiner 225 into a single fiber cable, and presented to an optical amplifier switch 230. Each optical data signal lags the optical signal in the next highest numbered branch by time $T+\tau$. Under control of control circuitry 250 the optical amplifier switch either selectively amplifies or blocks the respective N optical data signals. By selectively amplifying one signal and blocking the N−1 other signals, an N-slot dynamic optical buffer is created.

In general, the total attenuation of the buffer 200 due to splitting and combining losses is greater than $2 \times 10\text{Log}(N)$ dB, and therefore the insertion loss of an N-slot optical buffer having a single output optical amplifier switch is greater than $2 \times 10\text{Log}(N) - G$ dB, where G is the gain of the amplifier switch. If G=15 and the allowable insertion loss is 10 dB, then N must be less than 18. If G=15 and the allowable insertion loss is 0 dB, then N must be less than 6.

In order to insure that the buffer 200 is empty before another optical data signal enters the buffer, an input optical amplifier switch 205 may be utilized to the block incoming signals until the buffer is clear. Input amplifier switch is controlled by control circuity 250. Adding an input optical amplifier switch further reduces the insertion loss such that the loss is greater than $2 \times 10\text{Log}(N) - (G_{in} + G_{out})$, where $G_{in}$ and $G_{out}$ are the gains of the input and output amplifiers. If both amplifiers produce a gain of 15 dB, and an insertion loss of 10 dB is acceptable, then N must be less than 100. However, if both amplifiers produce a gain of 15 dB, and an insertion loss of 0 dB is desireable, then N must be less than 32.

Figure 3:
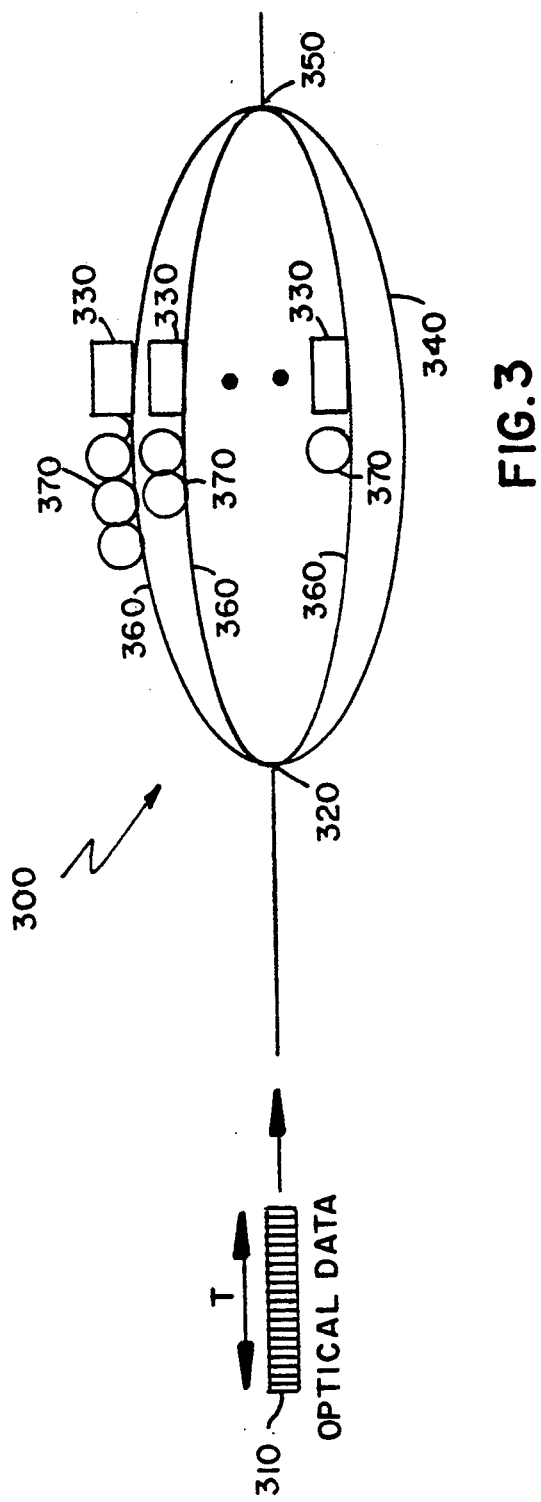
FIG. 3 is an illustration of a N-slot optical buffer utilizing a semiconductor laser amplifier in each branch of the buffer.

FIG. 3 illustrates a further embodiment of a N-slot dynamic buffer in accordance with the instant invention.

An optical data signal 310, having a duration of time T, is presented at the input port of the optical data buffer 300. Again, the data signal can be designed to represent only one bit, multiple bits, or a whole data frame. The optical data signal 310 is split with a 1×N passive splitter 320, and the signal in each branch is presented to a semiconductor laser amplifier 330 (SLA). A semiconductor laser amplifier can can detect the incoming signal, and selectively amplify or block the signal. With the SLA 330 in the amplifying or "on" state, the optical data signal in the first branch 340 of buffer 300 is combined into a fiber by a passive combiner 350, and incurrs a delay of $\tau$, where $\tau$ is defined as the travel time for the optical data signal to reach the input port of the combiner 350. Each of the other N−1 split signals propagate into one of the N−1 output branches 360 of the splitter 320, and is delayed by an optical delay 370. The delay 370 may be an extended length of fiber optic cable. The delay associated with the $k^{th}$ branch of the buffer is $(k-1) \times T + k \times \tau$. If the SLA in the $k^{th}$ branch is "on", the signal is combined at a N×1 combiner into a single fiber cable, otherwise the SLA blocks the signal.

Each optical data signal lags the optical signal in the next highest numbered branch by time $T+\tau$, and thus by providing control circiutry to control operation of the SLAs 330 to selectively amplify one signal and block the N−1 other signals, an N-slot fixed time dynamic optical buffer is created.

While there has been shown and described what are at present considered the preferred embodiments of the invention, it will be obvious to those skilled in the art that various changes and modifications can be made therein without departing from the scope of the invention as defined by the appended claims.

What is claimed is:

1. An optical data buffer for storing an optical signal for a variable duration comprising:
   optical splitter means for transferring an input optical signal to a plurality of output ports;
   fiber optic delay means coupled to each of said output ports for delaying an optical signal;
   combiner means coupled to each of the delay means for combining the optical signals of the delay means;
   semiconductor laser amplifier means coupled to the combiner means for selectively transmitting or blocking an optical signal;
   wherein said semiconductor laser amplifier blocks the transmission of an optical signal when not biased.

2. The optical data buffer of claim 1 wherein the fiber optic delay means is an extended fiber optic cable.

3. The optical data buffer of claim 2 wherein the fiber optic cable of the delay means is of variable length.

4. The optical data buffer of claim 1 wherein the semiconductor laser amplifier means includes a laser diode with facets coated for anti-reflection.

5. An optical data buffer for storing an optical signal for a variable duration comprising:
   optical splitter means for transferring an input optical signal to a plurality of output ports;
   fiber optic delay means coupled to each of said output ports for delaying an optical signal;
   semiconductor laser amplifier means coupled to each of the said delay means for selectively transmitting or blocking an optical signal;
   combiner means coupled to each of the amplifer means for receiving an optical signal of the amplifier means;
   wherein said semiconductor laser amplifier blocks the transmission of an optical signal when not biased.

6. The optical data buffer of claim 5 wherein the fiber optic delay means is an extended fiber optic cable.

7. The optical data buffer of claim 6 wherein the fiber optic cable of the delay means is of variable length.

8. The optical data buffer of claim 5 wherein the semiconductor laser amplifier means includes a laser diode with facets coated for anti-reflection.

* * * * *